Figure 1:
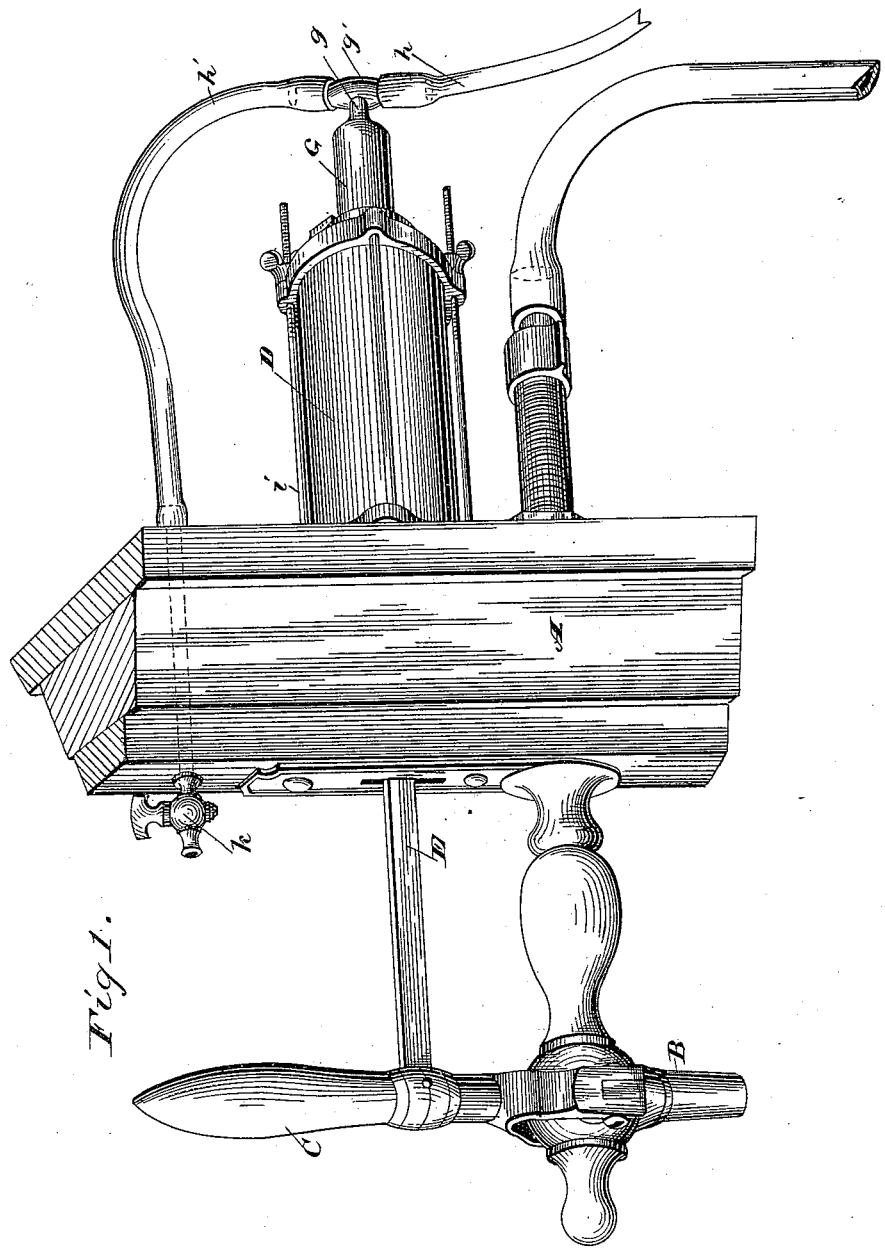

(No Model.)        2 Sheets—Sheet 1.

G. E. COLLINS.
BEER APPARATUS.

No. 342,733.        Patented May 25, 1886.

Witnesses:
Wm M. Monroe
M. L. Combes

Inventor
George E. Collins
by H. J. Fisher,
Attorney.

N. PETERS, Photo-Lithographer, Washington, D. C.

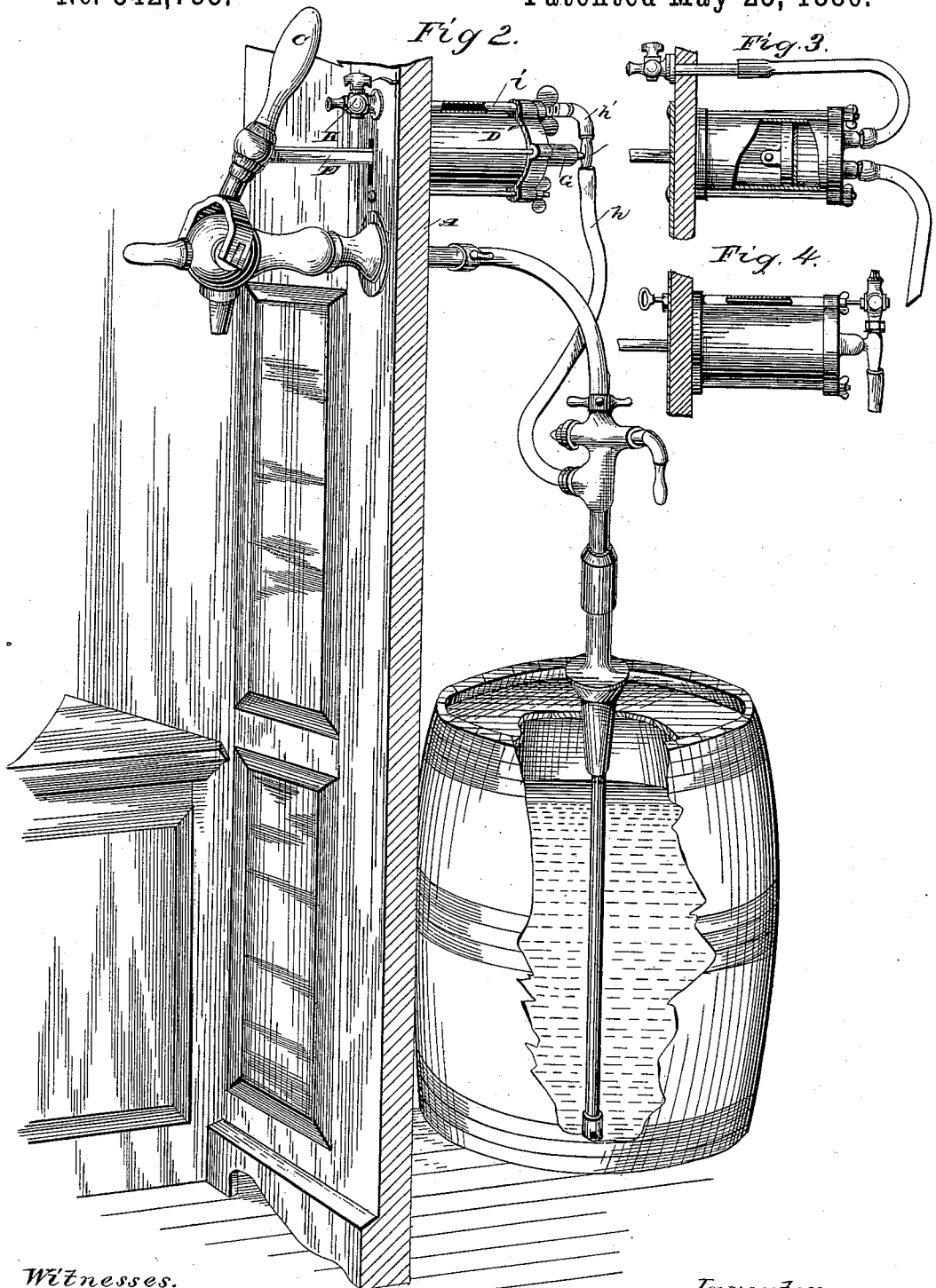

United States Patent Office.

GEORGE E. COLLINS, OF CLEVELAND, OHIO, ASSIGNOR OF TWO-THIRDS TO ALBERT J. WEATHERHEAD AND JACOB MAYER, BOTH OF SAME PLACE.

BEER APPARATUS.

SPECIFICATION forming part of Letters Patent No. 342,733, dated May 25, 1886.

Application filed March 26, 1886. Serial No. 196,607. (No model.)

*To all whom it may concern:*

Be it known that I, GEORGE E. COLLINS, a citizen of the United States, residing at Cleveland, in the county of Cuyahoga and State of Ohio, have invented certain new and useful Improvements in Beer Apparatus; and I do hereby declare that the following is a full, clear, and exact description of the invention, which will enable others skilled in the art to which it appertains to make and use the same.

My invention relates to improvements in beer apparatus, and has for its object to provide means whereby air which would otherwise be forced into the beer-barrel may be discharged outside, when for any reason it is not required to supply pressure to the beer.

In beer apparatus of the type illustrated in the drawings the air-pump and the draft-cock are operated simultaneously by the same lever, so that whenever beer is drawn compressed air is forced into the barrel. This operation is repeated at every stroke of the lever, whether more air is required in the barrel or not; and prior to my improvement there was no way of regulating the pressure in the barrel according to the needs of the beer; but I have learned from the experience of those who use the apparatus that some device which would enable them to control the compressed air and use more or less of it, as might be required, was absolutely necessary, and that no apparatus was complete without such controlling mechanism; otherwise, if the beer became too "lively" and produced an excessive amount of foam when drawn, there was no remedy, and every time a draft was made the maximum quantity of air would be pumped into the barrel, although there was an excess of it there already. I therefore conceived the idea of affording relief, which should be under the control of the person who draws the beer, and as each draft is made can tell exactly what pressure he needs. The means by which this is accomplished constitute my improvement; and the invention consists in the construction hereinafter described, and pointed out in the claims.

Referring to the accompanying drawings, Figure 1 is a perspective of a beer apparatus, partly broken away at the bottom, showing my escape attachment connected with the air-pump. Fig. 2 is an elevation of a beer apparatus in full, with the upper supporting-rod of the pump serving as an escape-tube. Fig. 3 shows the air pipes or tubes connected separately to the head of the pump, a free passage of air between the pipes being maintained in this instance through the pump-cylinder; and Fig. 4 shows the cock or valve operated by a rod from the outside of the refrigerator.

A represents the front wall of a refrigerator, to which the apparatus is attached.

B is the faucet; C, the operating-lever; D, the air-pump, fastened as usual to the inside of the refrigerator, and E a piston-rod connecting it with the lever. All these features are old and form no part of my improvement.

The outer end of the pump-cylinder is provided with a tubular discharge, G, having a nozzle, $g$, which carries a cross-head, $g'$, perforated throughout and communicating with the nozzle $g$. Rubber tubes $h$ $h'$ are connected to this cross-head, one of which leads to the beer-barrel and the other to a petcock or valve, $k$, outside the refrigerator, just above the pump-rod.

In operation the compressed air is forced through the discharge-tube and nozzle into cross-head, where its direction is governed by the petcock $k$. If the said cock is closed, the air will be driven through tube $h$ into the barrel; but if the valve $k$ is open the air will escape through the tube $h'$, and none will be forced into the barrel. The convenience of the petcock to the operating-lever enables the attendant to easily and quickly open or close it, as may be required, and this places the pump and the pressure of air in the barrel perfectly under his control.

In Fig. 2 I have shown a modification of my air-escape attachment, in which a tubular bolt is employed to serve the double purpose of supporting the pump and conveying the air out from escape-pipe $h'$ to the exterior of the refrigerator, where a suitable cock is placed to control the escape of air.

In Fig. 3 I show another modification, in which the pipe $h'$ is connected directly to the head of the pump-cylinder instead of being fastened to a T-tube, as shown in Fig. 1. By this means an open passage is maintained between the pipes $h\ h'$ through the pump-cylinder.

Fig. 4 represents a form of the device in which the shut-off cock or valve is located above the T-tube, and is operated by a rod running through the tube $i$, and having a handle outside the refrigerator to control it. In this instance the air is discharged directly into the refrigerator instead of being carried outside thereof, as in the other form shown.

It will be observed that at all times there is a free passage through the cross-head or T-tube $g'$ and the respective tubular connections above and below, whether the cock $k$ be open or closed.

Having thus described my invention, what I consider new, and desire to secure by Letters Patent, is—

1. In a beer apparatus, an air-pump having an air-pipe leading to the beer-barrel and an escape-pipe leading to the open air, said pipes being in unobstructed communication with each other, and the escape-pipe having a cut-off cock independent of the former pipe, substantially as described.

2. In a beer apparatus, an air-pump provided with a T-tube at its end, in combination with a pipe leading from one arm of the tube to the beer-barrel and an escape-pipe leading from the opposite arm to the open air, and a cut-off cock on said escape-pipe independent of the said tube, whereby unobstructed communication is maintained through the T-tube, substantially as set forth.

GEORGE E. COLLINS.

Witnesses:
H. T. FISHER,
WM. M. MONROE.